US012591773B2

(12) United States Patent
Zhu et al.

(10) Patent No.: US 12,591,773 B2
(45) Date of Patent: Mar. 31, 2026

(54) MACHINE LEARNING MODEL VALIDATION WITH VERIFICATION DATA

(71) Applicant: QUALCOMM Incorporated, San Diego, CA (US)

(72) Inventors: Xipeng Zhu, San Diego, CA (US); Taesang Yoo, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 804 days.

(21) Appl. No.: 17/585,399

(22) Filed: Jan. 26, 2022

(65) Prior Publication Data

US 2023/0259754 A1     Aug. 17, 2023

(51) Int. Cl.
*G06N 3/08* (2023.01)
*G06N 3/0464* (2023.01)
(Continued)

(52) U.S. Cl.
CPC ............. *G06N 3/08* (2013.01); *G06N 3/0464* (2023.01); *G06N 3/0495* (2023.01);
(Continued)

(58) Field of Classification Search
CPC ...... G06N 3/08; G06N 3/0464; G06N 3/0495; G06N 3/048; G06N 3/084; G06N 3/0895;
(Continued)

(56) References Cited

U.S. PATENT DOCUMENTS

| | | | |
|---|---|---|---|
| 7,475,048 B2 * | 1/2009 | Weston | G06F 18/2113 706/14 |
| 2015/0193697 A1 * | 7/2015 | Vasseur | H04L 47/2466 706/12 |

(Continued)

FOREIGN PATENT DOCUMENTS

AU     2021101172 A4     5/2021

OTHER PUBLICATIONS

Benjamin Kompa et al., "Second opinion needed: communicating uncertainty in medical machine learning", Jan. 5, 2021, Nature (Year: 2021).*

(Continued)

*Primary Examiner* — Omar F Fernandez Rivas
(74) *Attorney, Agent, or Firm* — Qualcomm Incorporated/Seyfarth Shaw LLP

(57) ABSTRACT

A method of wireless communication by a first network device includes receiving a machine learning model, the machine learning model being unvalidated and trained. The method also includes quantizing and compiling the machine learning model. The method further includes obtaining verification data. The method still further includes validating the machine learning model with the verification data to determine a performance level of the machine learning model. A method of wireless communication by a first network device includes transmitting machine learning model verification data to a second network device. The method also includes receiving a report, from the second network device, indicating performance of a machine learning model with the verification data. The method further includes validating the machine learning model in response to the performance satisfying a performance condition.

24 Claims, 10 Drawing Sheets

(51) Int. Cl.

| | |
|---|---|
| *G06N 3/048* | (2023.01) |
| *G06N 3/0495* | (2023.01) |
| *G06N 3/084* | (2023.01) |
| *G06N 3/0895* | (2023.01) |
| *G06N 3/09* | (2023.01) |
| *H04L 9/40* | (2022.01) |
| *H04W 12/106* | (2021.01) |
| *H04W 16/14* | (2009.01) |

(52) U.S. Cl.
CPC ......... *H04L 63/123* (2013.01); *H04W 12/106* (2021.01); *G06N 3/048* (2023.01); *G06N 3/084* (2013.01); *G06N 3/0895* (2023.01); *G06N 3/09* (2023.01); *H04W 16/14* (2013.01)

(58) Field of Classification Search
CPC ..... G06N 3/09; H04L 63/123; H04W 12/106; H04W 16/14; H04W 24/10
See application file for complete search history.

(56) References Cited

U.S. PATENT DOCUMENTS

| | | | | |
|---|---|---|---|---|
| 2016/0055426 | A1* | 2/2016 | Aminzadeh | G06N 7/01 |
| | | | | 706/12 |
| 2018/0068224 | A1* | 3/2018 | Chen | G06N 5/02 |
| 2019/0384981 | A1* | 12/2019 | Swaminathan | G06F 18/2431 |
| 2020/0364552 | A1* | 11/2020 | Guo | H03M 7/24 |
| 2021/0110310 | A1* | 4/2021 | Guim | G06F 16/27 |
| 2021/0263508 | A1* | 8/2021 | Wang | G05B 17/02 |
| 2022/0207361 | A1* | 6/2022 | Pang | G06N 3/08 |
| 2023/0376981 | A1* | 11/2023 | Hall | G06N 5/022 |

OTHER PUBLICATIONS

International Search Report and Written Opinion—PCT/US2023/010434—ISA/EPO—Apr. 12, 2023.

* cited by examiner

402

FULLY CONNECTED

404

LOCALLY CONNECTED

410

412

414

416

406

CONVOLUTIONAL

408

550

900

902 — RECEIVE AN UNVALIDATED AND TRAINED MACHINE LEARNING MODEL

904 — QUANTIZE AND COMPILE THE MACHINE LEARNING MODEL

906 — OBTAIN VERIFICATION DATA

908 — VALIDATE THE MACHINE LEARNING MODEL WITH THE VERIFICATION DATA TO DETERMINE A PERFORMANCE LEVEL OF THE MACHINE LEARNING MODEL

1000

1002   TRANSMIT MACHINE LEARNING MODEL VERIFICATION DATA TO A SECOND NETWORK DEVICE

1004   RECEIVE A REPORT, FROM THE SECOND NETWORK DEVICE, INDICATING PERFORMANCE OF A MACHINE LEARNING MODEL WITH THE VERIFICATION DATA

1006   VALIDATE THE MACHINE LEARNING MODEL IN RESPONSE TO THE PERFORMANCE SATISFYING A PERFORMANCE CONDITION

MACHINE LEARNING MODEL VALIDATION WITH VERIFICATION DATA

FIELD OF THE DISCLOSURE

The present disclosure relates generally to wireless communications, and more specifically to validation of machine learning models with verification data, prior to prediction or decision making with the machine learning models.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a first network device includes receiving a machine learning model, the machine learning model being unvalidated and trained. The method also includes quantizing and compiling the machine learning model. The method further includes obtaining verification data. The method still further includes validating the machine learning model with the verification data to determine a performance level of the machine learning model.

In other aspects of the present disclosure, a method of wireless communication by a first network device includes transmitting machine learning model verification data to a second network device. The method also includes receiving a report, from the second network device, indicating performance of a machine learning model with the verification data. The method further includes validating the machine learning model in response to the performance satisfying a performance condition.

Other aspects of the present disclosure are directed to an apparatus for wireless communication by a first network device. The apparatus has a memory and one or more processors coupled to the memory. The processor(s) is configured to receive a machine learning model, the machine learning model being unvalidated and trained. The processor(s) is also configured to quantize and compile the machine learning model. The processor(s) is further configured to obtain verification data. The processor(s) is still further configured to validate the machine learning model with the verification data to determine a performance level of the machine learning model.

Other aspects of the present disclosure are directed to an apparatus for wireless communication by a first network device having a memory and one or more processor(s) coupled to the memory. The processor(s) is configured to transmit machine learning model verification data to a second network device. The processor(s) is also configured to receive a report, from the second network device, indicating performance of a machine learning model with the verification data. The processor(s) is further configured to validate the machine learning model in response to the performance satisfying a performance condition.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
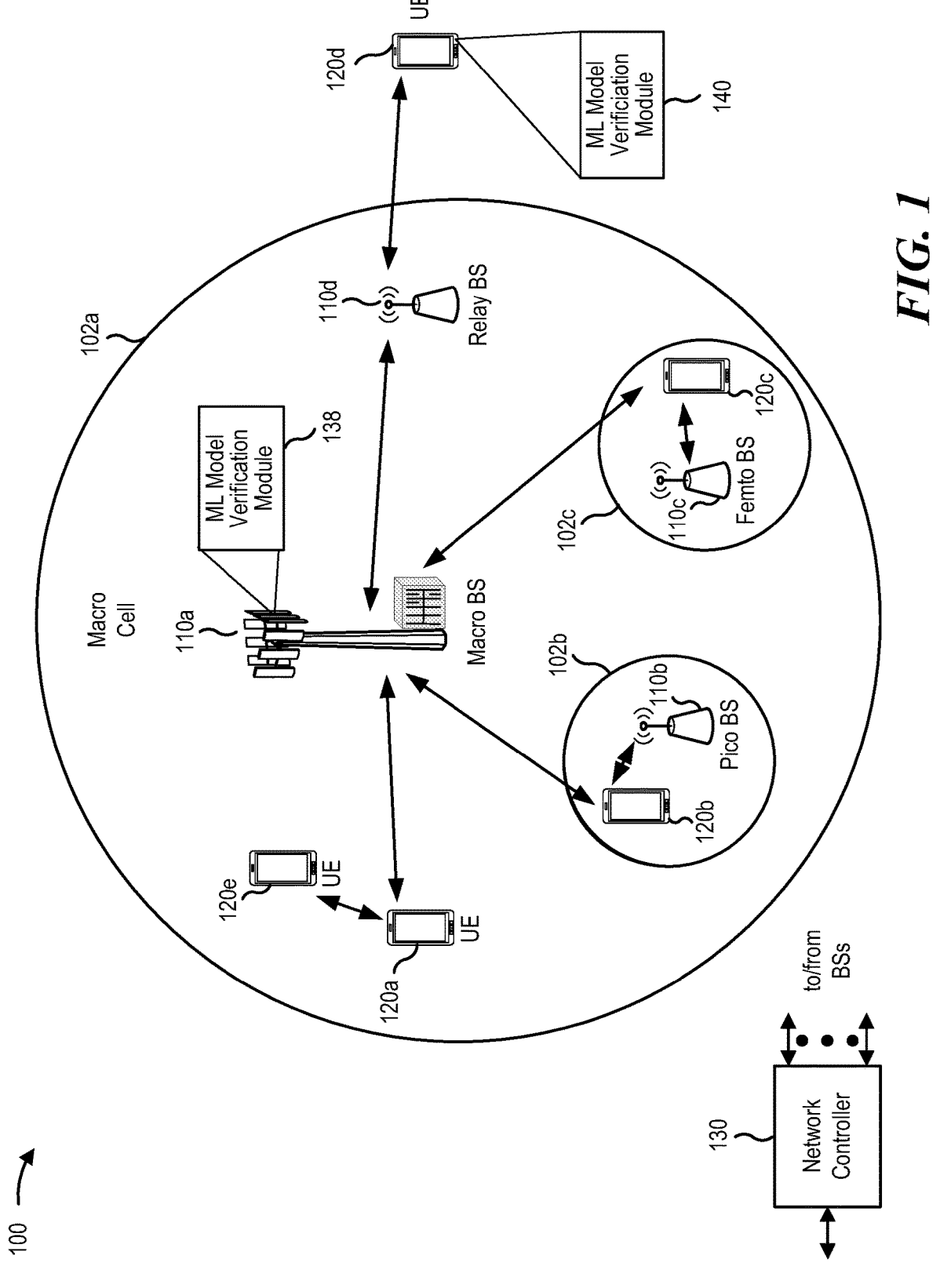
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A poor machine learning (ML) model downgrades the user equipment (UE) performance and also network performance. Therefore, it may be desirable to validate a machine learning model before the machine learning model is used for prediction and decision making. In some implementations, each network may validate a machine learning model separately in a server. Additionally, the network may, potentially, validate the machine learning model locally, such as in different types of UEs and different types of network equipment.

A machine learning model should be validated when a running environment is different from an environment where the model was developed and/or trained. Validation should also occur when input data is quantized and/or the machine learning model is optimized. Quantization may include converting floating point data into integer data, for example.

A machine learning model is validated by verification data. Verification data may include a small set of samples, such as sample i having input vector $X_i$ and the expected output: output vector $Y_i$. Accuracy criteria for validating machine learning models may include a threshold of maximum error: $E_{max}$ and/or a threshold of maximum mean square error (MSE): $E_{mean}$.

Aspects of the present disclosure introduce procedures for UE machine learning model validation as well as procedures for downloading verification data to validate machine learning models.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrow band internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB)).

The UEs 120 may include a machine learning (ML) model verification module 140. For brevity, only one UE 120d is shown as including the ML model verification module 140. The ML model verification module 140 may receive a machine learning model, the machine learning model being unvalidated and trained. The ML model verification module 140 may also quantize and compile the machine learning model. The ML model verification module 140 may further obtain verification data. The ML model verification module 140 may still further validate the machine learning model with the verification data to determine a performance level of the machine learning model.

The base stations 110 may include a machine learning (ML) model verification module 138. For brevity, only one base station 110a is shown as including the ML model verification module 138. The ML model verification module 138 may transmit machine learning model verification data to a second network device. The ML model verification module 138 may also receive a report, from the second network device, indicating performance of a machine learning model with the verification data. The ML model verification module 138 may further validate the machine learning model in response to the performance satisfying a performance condition.

As indicated above, FIG. 1 is provided merely as an example. Other examples may differ from what is described with regard to FIG. 1.

Figure 2:
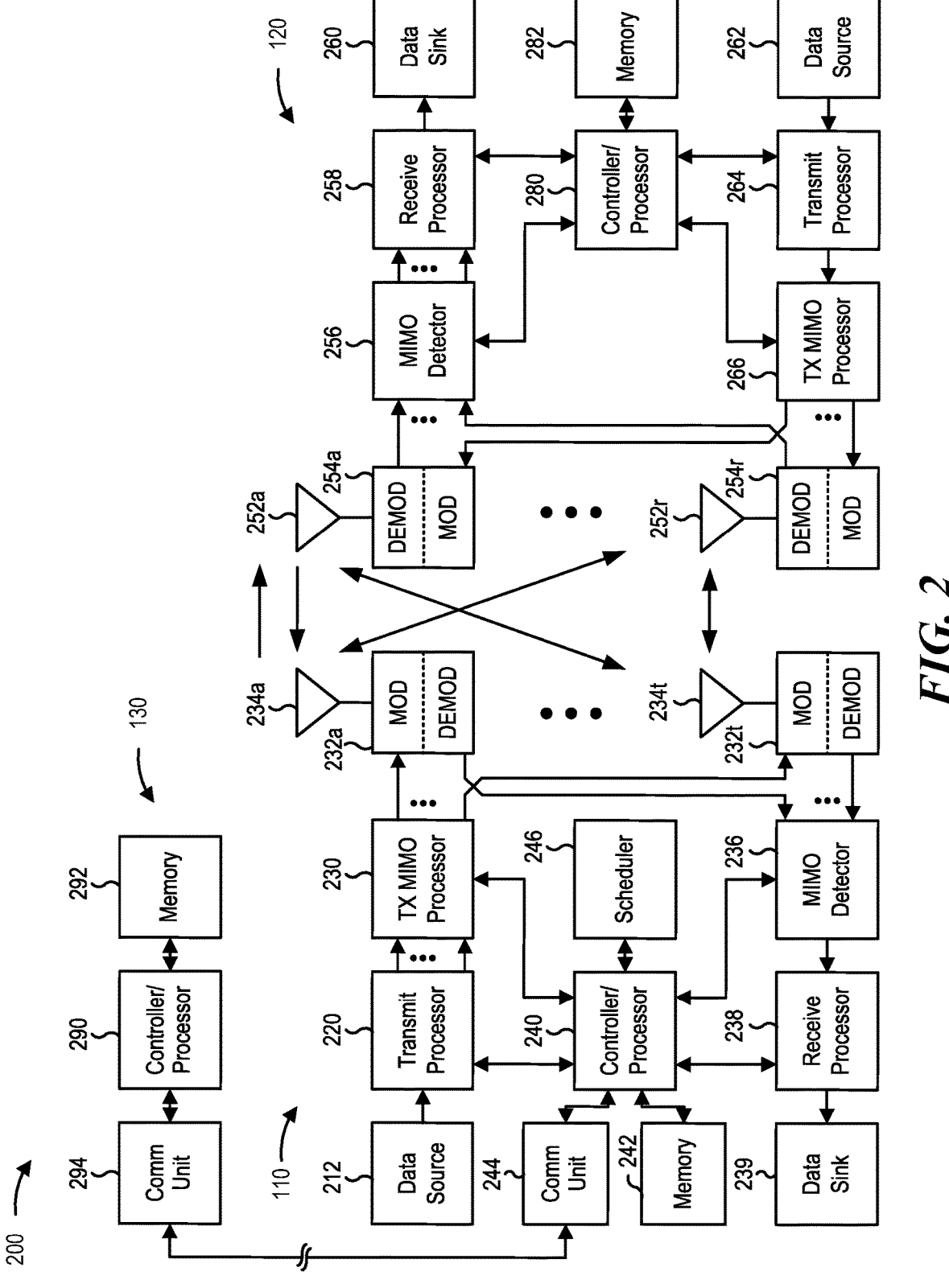
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below; the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning model verification, as described in more detail elsewhere. For example, the controller/processor 240 of the base station 110, the controller/processor 280 of the UE 120, and/or any other component(s) of FIG. 2 may perform or direct operations of, for example, the processes of FIGS. 7-10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for quantizing and compiling, means for obtaining, means for validating, means for reporting, means for adjusting, and means for re-compiling. In some aspects, the base station 110 may include means for receiving, means for transmitting, and means for validating. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
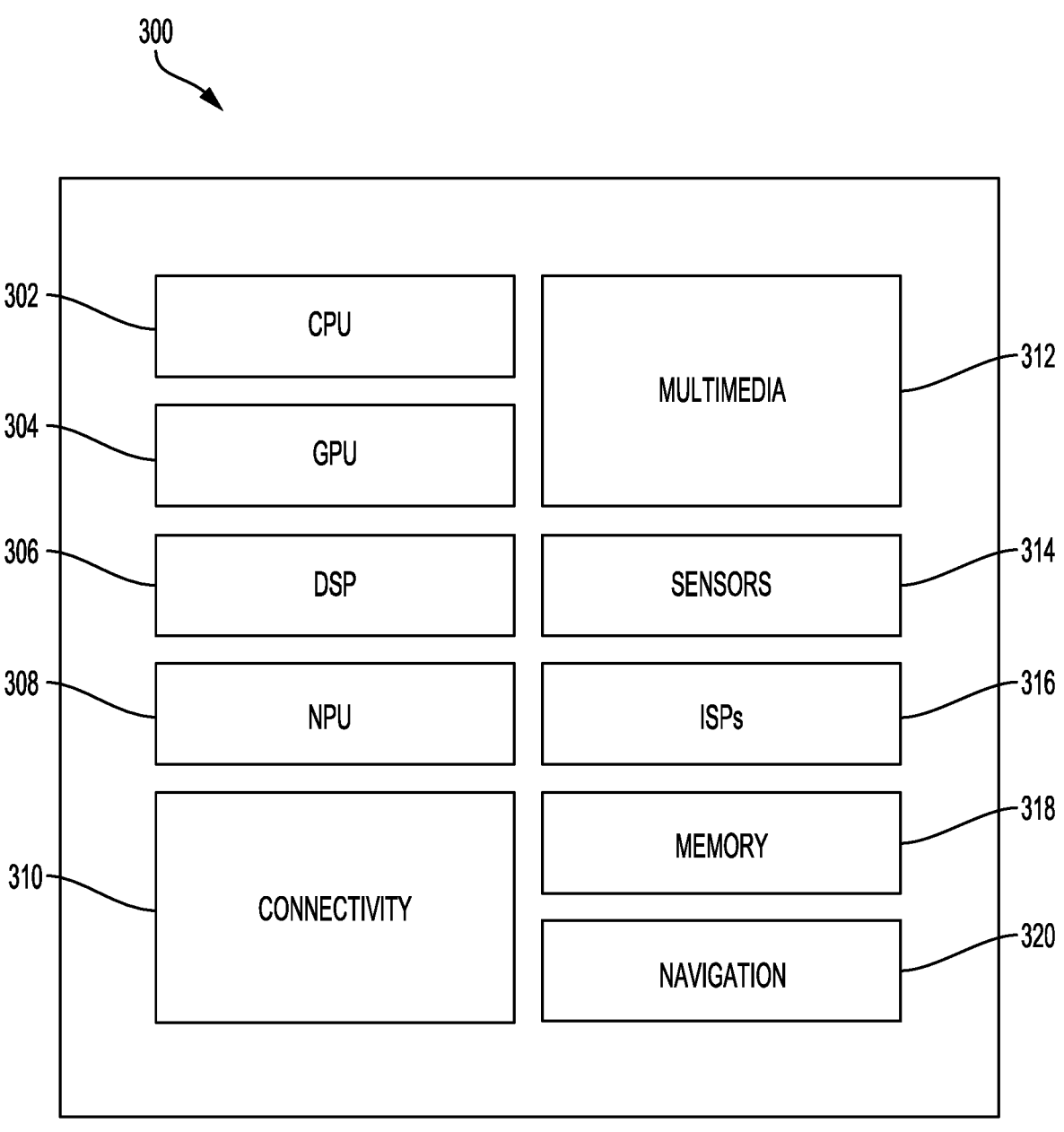
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In aspects of the present disclosure, the instructions loaded into the general-purpose processor 302 may comprise code to receive a machine learning model, the machine learning model being unvalidated and trained. The general-purpose processor 302 may also comprise code to quantize and compile the machine learning model. The general-purpose processor 302 may further comprise code to obtain verification data. The general-purpose processor 302 may still further comprise code to validate the machine learning model with the verification data to determine a performance level of the machine learning model.

In other aspects of the present disclosure, the instructions loaded into the general-purpose processor 302 may comprise code to transmit machine learning model verification data to a second network device. The general-purpose processor 302 may also comprise code to receive a report, from the second network device, indicating performance of a machine learning model with the verification data. The general-purpose processor 302 may further comprise code to validate the machine learning model in response to the performance satisfying a performance condition.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
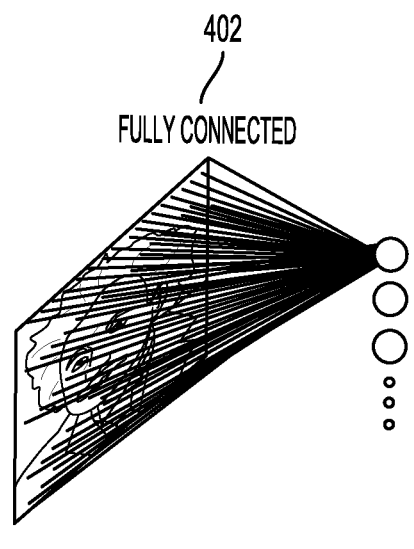
FIGS. 4A, 4B, and 4C are diagrams illustrating a neural network, in accordance with aspects of the present disclosure.
Figure 4B:
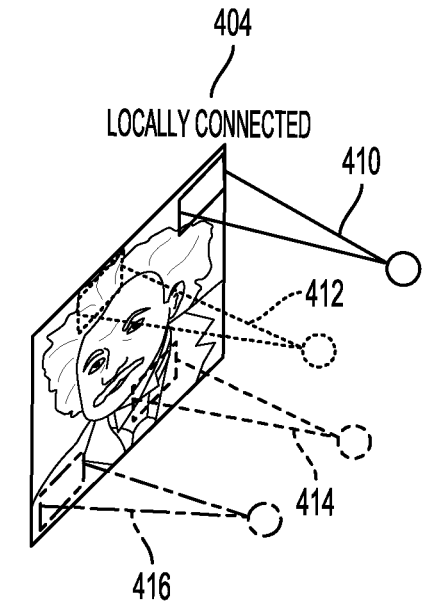

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
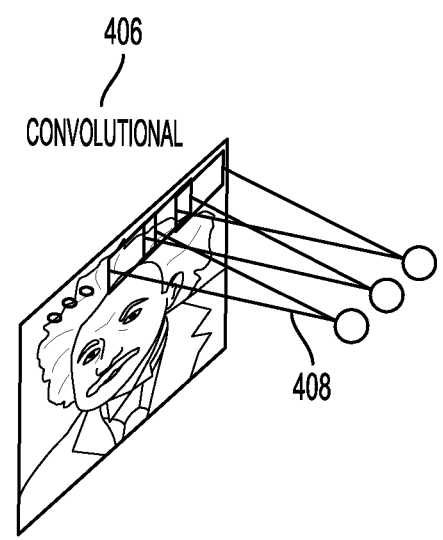

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
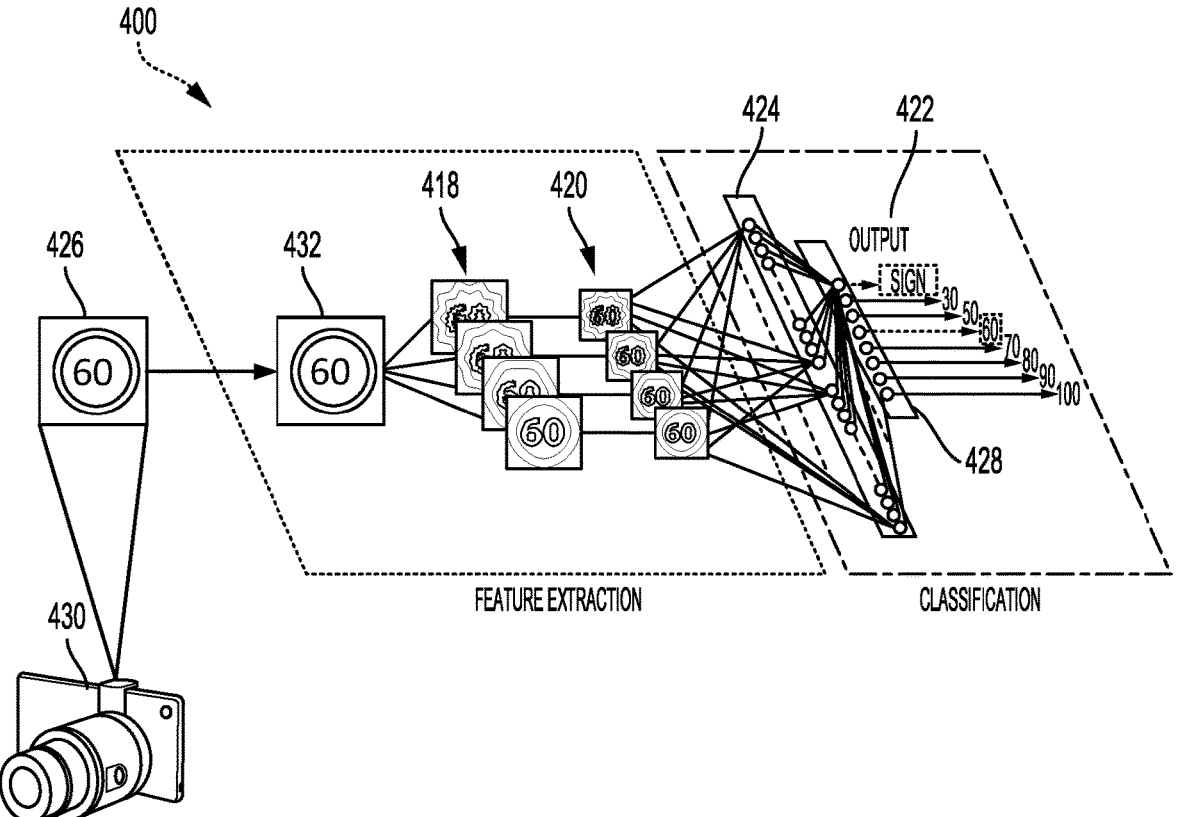
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max (0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
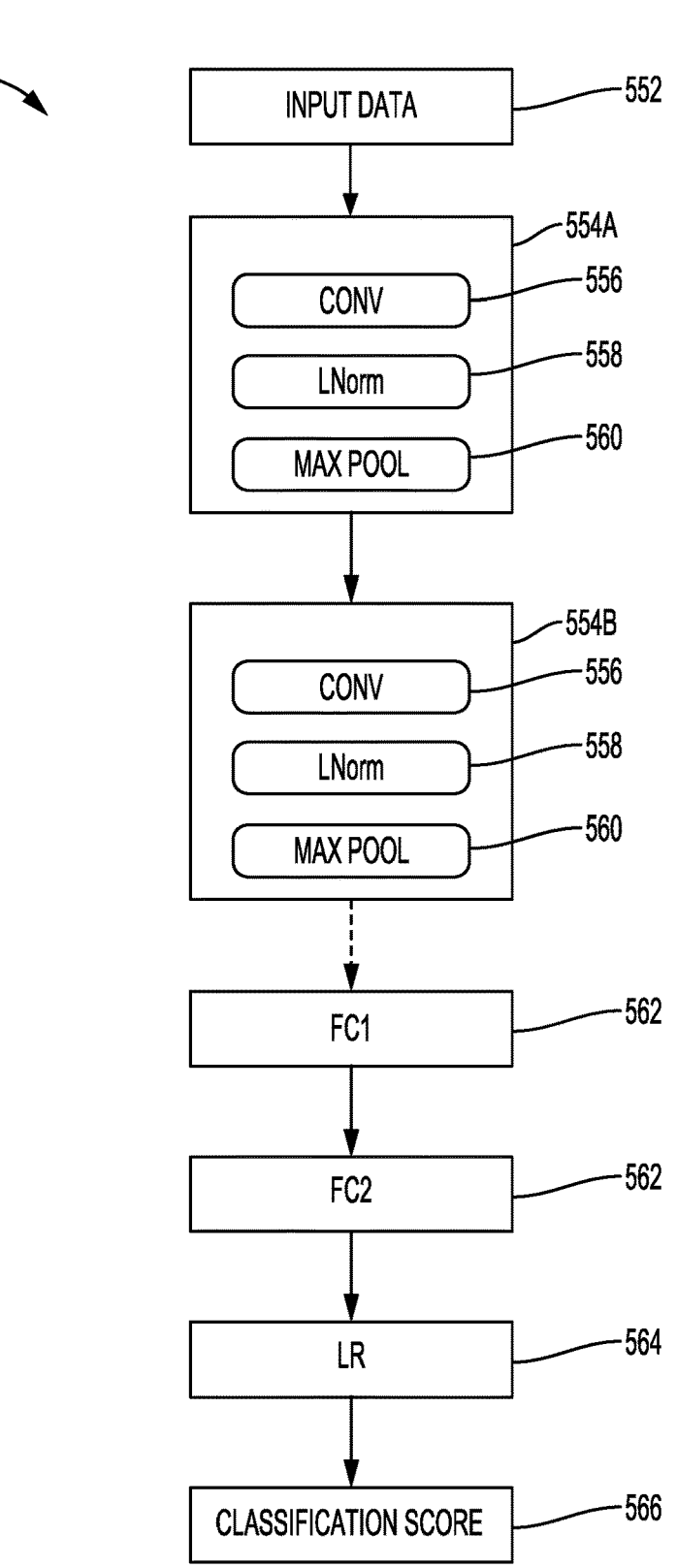
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As discussed, a machine learning (ML) model should be validated before being used for prediction and decision making. Validation may mitigate poor user equipment (UE) performance and also poor network performance that may be caused by a poor model. Each network may validate a machine learning model separately in a server, and also potentially locally (e.g., in different types of UEs and different types of network equipment).

A machine learning model should be validated when the running environment is different from the environment where the model was developed and/or trained. Validation should also occur when input data is quantized and/or the machine learning model is optimized. Quantization may include converting floating point data to integer data, for example.

A machine learning model may be validated with verification data. Verification data may include a small set of n samples, such as sample i having input vector $X_i$ and the expected output: output vector $Y_i$. Accuracy criteria for validating machine learning models may include a threshold of maximum error: $E_{max}$ and/or a threshold of maximum mean square error (MSE): $E_{mean}$. Meeting the threshold of maximum error or MSE may satisfy a performance condition. In these examples, Model: Y=F(X) can be verified by the below functions:

$$\max |F(X_i) - Y_i| \cdot W < E_{max}$$

$$\frac{\sum_{i=0}^{n} |F(X_i) - Y_i| \cdot W^2}{n} < E_{mean},$$

where W is a weight for each output parameter such that:
W*Y=$y_1$*$w_1$+$y_2$*$w_2$ . . . ;
Y=($y_1$, $y_2$, $y_3$ . . . ); and
W=($w_1$, $w_2$, $w_3$ . . . ).

Aspects of the present disclosure introduce procedures for UE machine learning model validation as well as procedures for downloading verification data to validate machine learning models.

Figure 6:
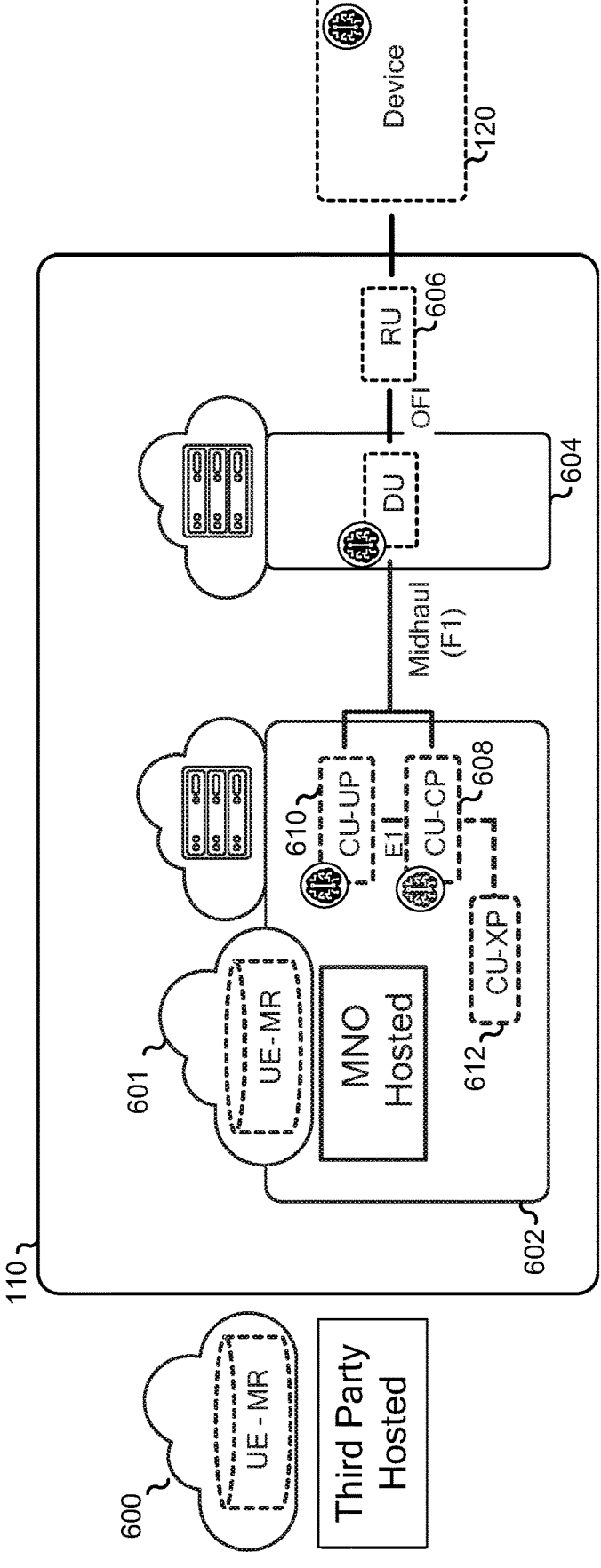
FIG. 6 is a block diagram illustrating a machine learning model management architecture, in accordance with various aspects of the present disclosure.

FIG. 6 is a block diagram illustrating a machine learning model management architecture, according to aspects of the present disclosure. In the example shown in FIG. 6, a UE model repository (UE-MR) 600, 601 stores and retrieves machine learning models for training and/or inference at a device (e.g., a UE 120). The UE model repository 600, 601 may be hosted by a third party, such as a UE vendor, or may be hosted by a mobile network operator (MNO). If the UE mobile repository 600 is third party hosted, the model and parameter configuration may be either integrated or separate. The model format at the model repository may be executable and model compilation may occur at the third party. If the UE mobile repository 601 is hosted by a mobile network operator, the model and parameter configuration may be separate. The model format at the model repository may be standardized (e.g., an open neural network exchange (ONNX) format) and model compilation may occur at the device or may be run time executable.

A base station 110 may store the UE model repository 601 when it is hosted by a mobile network operator. The base station 110 may also include a number of logical entities, such as a centralized unit (CU) 602, at least one distributed unit (DU) 604 (only one shown), and at least one radio unit (RU) 606 (only one shown).

The base station 110 may be functionally split into a centralized unit (CU) 602, distributed units (DUs) 604, and radio units (RUs) 606. Each CU 602 communicates with a network controller 130 (see FIGS. 1 and 2) via a backhaul connection. The CU 602 communicates with each of the DUs 604 via an F1 interface. The DU 604 is for managing the radio link control (RLC) layer, the media access control (MAC) layer, and parts of the physical (PHY) layer of the base station 110. The DU 604 communicates with each of the RUs 606 via a fronthaul connection, which may be an open radio access network (ORAN) fronthaul interface (OFI). The RUs 606 of the base station 110 manage the digital front end and parts of the physical (PHY) layer for communicating wirelessly with the UEs 120 (only one shown). The RUs 606 each communicate with multiple UEs 120 via a physical downlink shared channel (PDSCH) and physical uplink shared channel (PUSCH), for example.

The CU 602 includes a centralized unit control plane (CU-CP) 608 for managing the radio resource control (RRC) layer and packet data convergence protocol (PDCP) layer of the base station 110. The CU 602 also includes a centralized unit user plane (CU-UP) 610 for managing the user plane part of the PDCP layer and the user plane part of the service data adaptation protocol (SDAP) layer. The CU 602 further includes a centralized unit machine learning plane (CU-XP) 612 for managing machine learning functions, such as which model to select to execute a neural network function. The CU-CP 608, CU-UP 610, and CU-XP 612 communicate with each other via an E1 interface. While the CU-XP 612 is illustrated in FIG. 6 as being part of the base station 110, separate from the CU-CP 608, the CU-XP 612 may alternatively be implemented as part of the CU-CP 608 or as (a portion of) a network entity separate from the base station 110.

Various entities within the network may manage artificial intelligence (AI) or machine learning (ML) functions. For example, the CU-XP 612 may configure and manage device AI/ML network assisted functions. Radio access network (RAN) elements (such as the CU-CP 608, CU-UP 610, and DU 604), as well as the device itself (e.g., the UE 120), may host online inference and model training functions that are configured and managed by the CU-XP 612. The UE model repository (UE-MR) 600, 601 may store and retrieve machine learning models for training or inference used by the UE 120 or network entities, such as the CU 602, the DU 604, or a radio access network (RAN) intelligent controller (RIC) (not shown).

Figure 7:
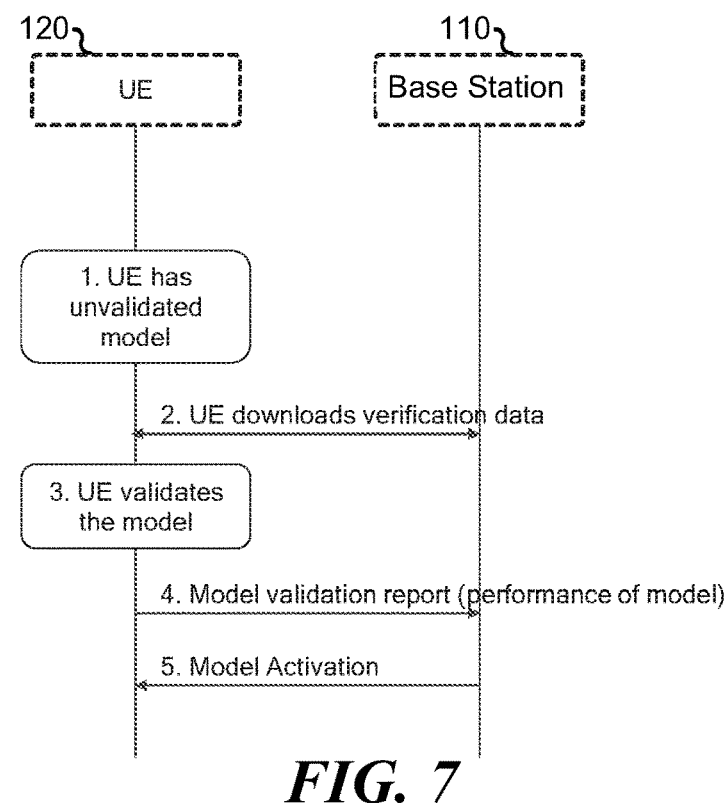
FIG. 7 is a timing diagram illustrating machine learning model verification at a user equipment (UE), in accordance with various aspects of the present disclosure.

FIG. 7 is a timing diagram illustrating machine learning model verification at a user equipment (UE), according to aspects of the present disclosure. In the example of FIG. 7, at time 1, the UE 120 locally stores an unvalidated model. For example, the machine learning model may have been downloaded from the base station 110 or UE-MR (not shown in FIG. 7). The model download may have been triggered by network configuration of the UE 120, for example, in response to a change in UE environment. When the UE 120 quantizes model inputs and/or compiles the machine learning model (e.g., when a raw model, such as a raw model in the ONNX format is downloaded), accuracy of the model may be affected. Consequently, validation of the model is desired.

According to aspects of the present disclosure, at time 2, the UE 120 downloads verification data from the base station 110. The base station 110 may transmit the verification data in response to receiving a request from the UE 120. Optionally, the base station 110 also transmits verification rules. For example, the verification rules may indicate accuracy criteria, such as the previously described thresholds for maximum error or maximum mean square error, as well as the weights, W. The verification data may be downloaded from a UE-MR or a ML server of the base station 110. For example, the UE 120 may receive a uniform resource locator (URL) corresponding to verification data based on information such as a model ID, a UE type, and/or other running environment parameters. Although FIG. 7 shows downloading of the verification data after the UE 120 has obtained the unvalidated machine learning model, the verification data may be downloaded before, during, or after model download. In some aspects, the UE 120 may use local verification data instead of, or in addition to, downloaded verification data.

At time 3, the UE 120 validates the model using the verification data. If the UE 120 is not satisfied with the performance of the model, the UE 120 may adjust the quantization and re-compile the model. At time 4, the UE 120 transmits a model validation report to the base station 110. At time 5, the base station 110 may activate the model, if performance criteria are satisfied. Otherwise, the base station 110 may configure a new model or fallback to a traditional non-machine learning solution. The model validation report and model activation at times 4 and 5 are optional, depending on use case and network configuration.

Figure 8:
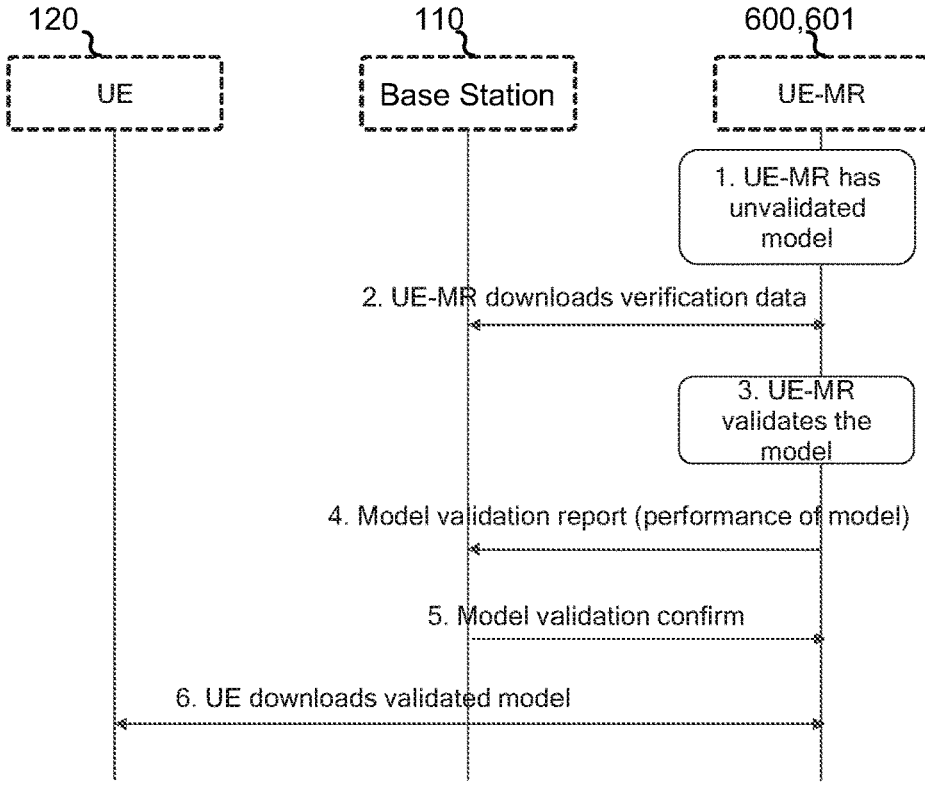
FIG. 8 is a timing diagram illustrating machine learning model verification at a user equipment model repository (UE-MR), in accordance with various aspects of the present disclosure.

FIG. 8 is a timing diagram illustrating machine learning model verification at a user equipment model repository (UE-MR), according to aspects of the present disclosure. In the example of FIG. 8, model verification occurs at the UE mode repository (UE-MR) 600, 601 instead of at the UE 120.

In the example of FIG. 8, at time 1, the UE-MR 600,601 has an unvalidated model. For example, the machine learning model may have been received from the base station 110 or the UE 120. When the UE-MR 600, 601 quantizes model inputs and/or compiles the machine learning model (e.g., when a raw model such as one in the ONNX format is received), accuracy of the model may be affected. Consequently, validation of the machine learning model is desired.

According to aspects of the present disclosure, at time 2, the UE-MR 600,601 downloads verification data from the base station 110. The base station 110 may transmit the verification data in response to receiving a request from the UE-MR 600, 601. Optionally, the base station 110 also transmits verification rules. For example, the verification rules may indicate accuracy criteria such as the previously described thresholds for maximum error or maximum mean square error, as well as the weights, W. Although FIG. 8 shows receiving of the verification data after the UE-MR 600, 601 has obtained the unvalidated machine learning model, the verification data may be downloaded before, during or after model receipt. In some aspects, the UE-MR 600, 601 may use local verification data instead of, or in addition to, verification data received from the base station 110.

At time 3, the UE-MR 600, 601 validates the model using the verification data. If the performance of the model is not satisfactory, the UE-MR 600, 601 may repeat quantization and compiling of the model to find a suitable quantization. At time 4, the UE-MR 600, 601 transmits a model validation report to the base station 110, indicating model performance. At time 5, the base station 110 may confirm the model validation if performance criteria are satisfied. In response to receiving confirmation of model validation, at time 6 the UE-MR 600, 601 makes the model available for the UE 120 to download.

Figure 9:
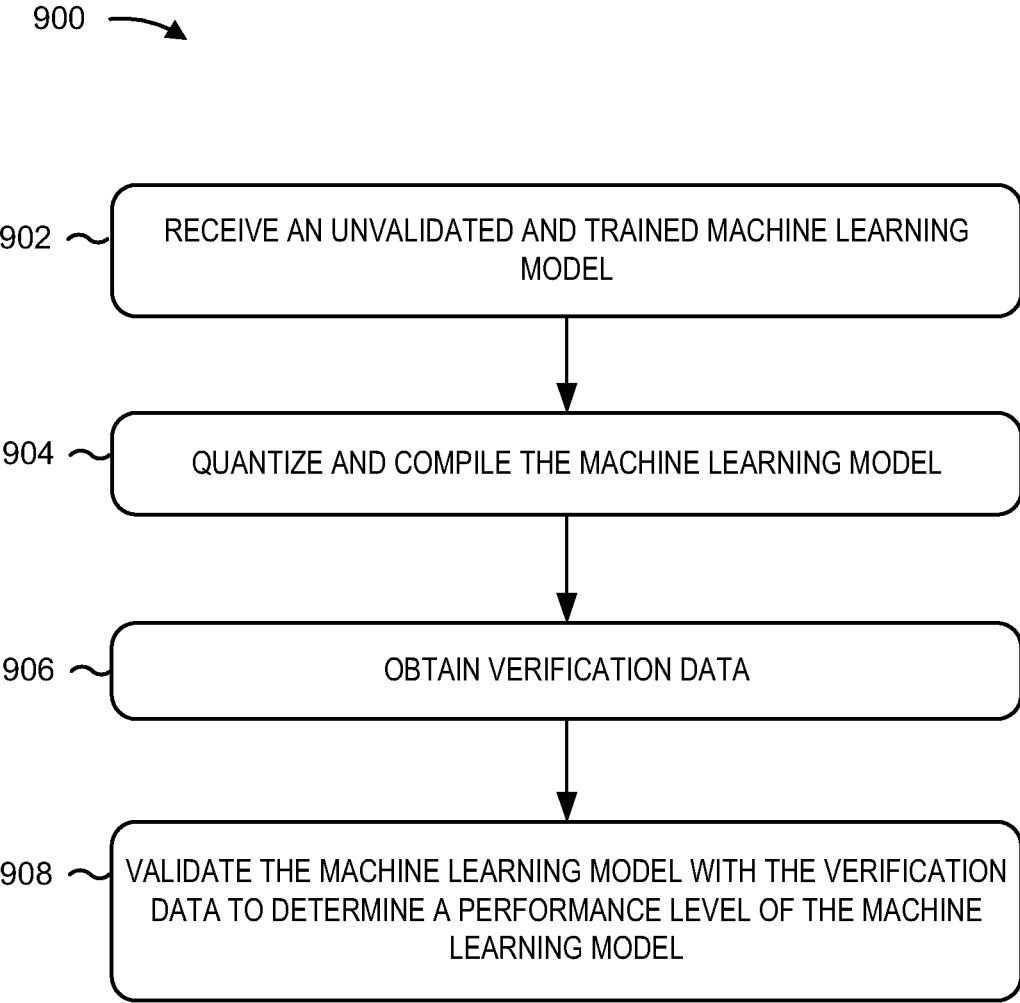
FIG. 9 is a flow diagram illustrating an example process performed, for example, by a first network device, in accordance with various aspects of the present disclosure.

FIG. 9 is a flow diagram illustrating an example process 900 performed, for example, by a first network device, in accordance with various aspects of the present disclosure. The example process 900 is an example of machine learning model validation with verification data. The operations of the process 900 may be implemented by a UE 120.

At block 902, the user equipment (UE) receives a machine learning model, the machine learning model being unvalidated and trained. For example, the UE (e.g., using the antenna 252, DEMOD/MOD 254, MIMO detector 256, receive processor 258, controller/processor 280 and/or memory 282) may receive a machine learning model.

At block 904, the user equipment (UE) quantizes and compiles the machine learning model. For example, the UE (e.g., using the controller/processor 280 and/or memory 282) may quantize and compile the machine learning model. In some aspects, the UE adjusts the quantization in response to the performance level being less than a threshold level, and re-compiles the machine learning model in response to the performance level being less than the threshold level.

At block 906, the user equipment (UE) obtains verification data. For example, the UE (e.g., using the antenna 252, DEMOD/MOD 254, MIMO detector 256, receive processor 258, controller/processor 280 and/or memory 282) may obtain the verification data. The verification data may be obtained by a second network device, which may be a machine learning server or UE model repository, in some examples.

At block 908, the user equipment (UE) validates the machine learning model with the verification data to determine a performance level of the machine learning model. For example, the UE (e.g., using the controller/processor 280 and/or memory 282) may validate the machine learning model. The UE may validate the machine learning model based on a maximum error threshold or a maximum mean square error (MSE) threshold. In some aspects, the UE reports the performance level to a second network device.

Figure 10:
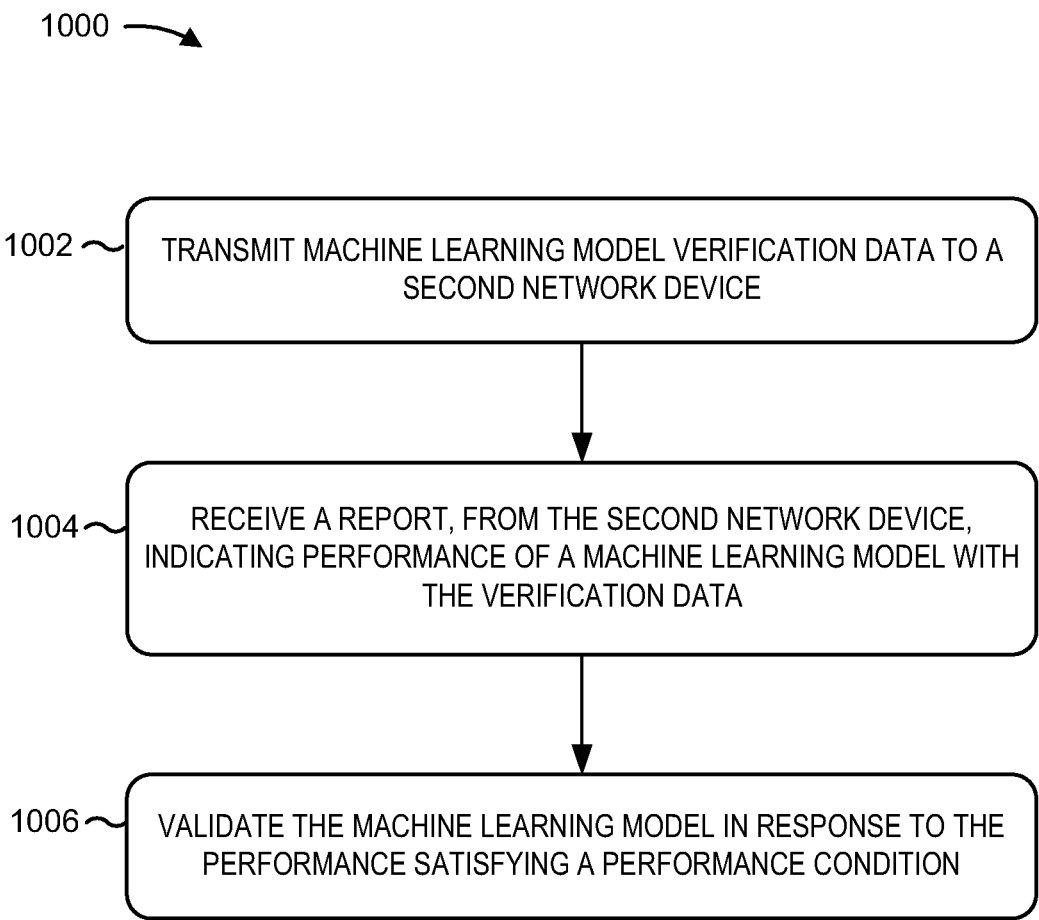
FIG. 10 is a flow diagram illustrating another example process performed, for example, by a first network device, in accordance with various aspects of the present disclosure.

FIG. 10 is a flow diagram illustrating another example process 1000 performed, for example, by a first network device, in accordance with various aspects of the present disclosure. The example process 1000 is an example of machine learning model validation with verification data. The operations of the process 1000 may be implemented by a network device.

At block 1002, the first network device transmits machine learning model verification data to a second network device. For example, the first network device (e.g., using the antenna 234, MOD/DEMOD 232, TX MIMO processor 230, transmit processor 220, controller/processor 240 and/or memory 242) may transmit the machine learning model verification data. Optionally, the first network device also transmits verification rules. For example, the verification rules may indicate accuracy criteria, such as thresholds for maximum error or maximum mean square error, as well as weights. The verification data may be downloaded from a UE-MR or a ML server of the first network device.

At block 1004, the first network device receives a report, from the second network device, indicating performance of a machine learning model with the verification data. For example, the first network device (e.g., using the antenna 234, MOD/DEMOD 232, MIMO detector 236, receive processor 238, controller/processor 240 and/or memory 242) may receive the report. At block 1006, the first network device validates the machine learning model in response to the performance satisfying a performance condition. For example, the first network device (e.g., using the controller/processor 240 and/or memory 242) may validate the machine learning model. The validating of the machine learning model may be based on a maximum error threshold or a maximum mean square error (MSE) threshold.

EXAMPLE ASPECTS

Aspect 1: A method of wireless communication by a first network device, comprising: receiving a machine learning model, the machine learning model being unvalidated and trained; quantizing and compiling the machine learning model; obtaining verification data; and validating the machine learning model with the verification data to determine a performance level of the machine learning model.

Aspect 2: The method of Aspect 1, further comprising reporting the performance level to a second network device.

Aspect 3: The method of Aspect 1 or 2, in which obtaining the verification data comprises receiving the verification data from a second network device.

Aspect 4: The method of any of the preceding Aspects, in which the second network device comprises a machine learning server or a user equipment model repository (UE MR).

Aspect 5: The method of any of the preceding Aspects, further comprising: adjusting a quantization in response to the performance level being less than a threshold level; and re-compiling the machine learning model in response to the performance level being less than the threshold level.

Aspect 6: The method of any of the preceding Aspects, in which the first network device comprises a user equipment (UE).

Aspect 7: The method of any of the preceding Aspects, further comprising: receiving first instructions to activate the machine learning model in response to the performance level exceeding a threshold level; and receiving second instructions to fall back to a non-machine learning model or reconfigure the machine learning model in response to the performance level being below the threshold level.

Aspect 8: The method of any of the preceding Aspects, in which the first network device comprises a user equipment model repository (UE MR).

Aspect 9: The method of any of the preceding Aspects, in which validating the machine learning model is based on a maximum error threshold.

Aspect 10: The method of any of the Aspects 1-8, in which validating the machine learning model is based on a maximum mean square error (MSE) threshold.

Aspect 11: A method of wireless communication by a first network device, comprising: transmitting machine learning model verification data to a second network device; receiving a report, from the second network device, indicating performance of a machine learning model with the verification data; and validating the machine learning model in response to the performance satisfying a performance condition.

Aspect 12: The method of Aspect 11, in which the second network device comprises a user equipment (UE).

Aspect 13: The method of Aspect 11, in which the second network device comprises a user equipment model repository (UE-MR).

Aspect 14: The method of any of the Aspects 11-13, in which the performance condition is based on a maximum error threshold.

Aspect 15: The method of any of the Aspects 11-13, in which the performance condition is based on a maximum mean square error (MSE) threshold.

Aspect 16: An apparatus for wireless communication by a first network device, comprising: a memory; and at least one processor coupled to the memory, the at least one processor configured: to receive a machine learning model, the machine learning model being unvalidated and trained: to quantize and compile the machine learning model: to obtain verification data; and to validate the machine learning model with the verification data to determine a performance level of the machine learning model.

Aspect 17: The apparatus of Aspect 16, in which the at least one processor is further configured to report the performance level to a second network device.

Aspect 18: The apparatus of Aspect 16 or 17, in which the at least one processor is further configured to receive the verification data from a second network device to obtain the verification data.

Aspect 19: The apparatus of any of the Aspects 16-18, in which the second network device comprises a machine learning server or a user equipment model repository (UE MR).

Aspect 20: The apparatus of any of the Aspects 16-19, in which the at least one processor is further configured: to adjust a quantization in response to the performance level being less than a threshold level; and to re-compile the machine learning model in response to the performance level being less than the threshold level.

Aspect 21: The apparatus of any of the Aspects 16-20, in which the first network device comprises a user equipment (UE).

Aspect 22: The apparatus of any of the Aspects 16-21, in which the at least one processor is further configured: to receive first instructions to activate the machine learning model in response to the performance level exceeding a threshold level; and to receive second instructions to fall back to a non-machine learning model or reconfigure the machine learning model in response to the performance level being below the threshold level.

Aspect 23: The apparatus of any of the Aspects 16-22, in which the first network device comprises a user equipment model repository (UE MR).

Aspect 24: The apparatus of any of the Aspects 16-23, in which the at least one processor is configured to validate the machine learning model based on a maximum error threshold.

Aspect 25: The apparatus of any of the Aspects 16-23, in which the at least one processor is configured to validate the machine learning model based on a maximum mean square error (MSE) threshold.

Aspect 26: An apparatus for wireless communication by a first network device, comprising: a memory; and at least one processor coupled to the memory, the at least one processor configured: to transmit machine learning model verification data to a second network device; to receive a report, from the second network device, indicating performance of a machine learning model with the verification data; and to validate the machine learning model in response to the performance satisfying a performance condition.

Aspect 27: The apparatus of Aspect 26, in which the second network device comprises a user equipment (UE).

Aspect 28: The apparatus of Aspect 26 or 27, in which the second network device comprises a user equipment model repository (UE-MR).

Aspect 29: The apparatus of any of the Aspects 26-28, in which the performance condition is based on a maximum error threshold.

Aspect 30: The apparatus of any of the Aspects 26-28, in which the performance condition is based on a maximum mean square error (MSE) threshold.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:

wirelessly receiving a network configuration from a network device in response to a change in UE environment;

wirelessly receiving from the network device, at the UE, a machine learning model in accordance with the network configuration, the machine learning model being unvalidated and trained;

quantizing inputs to the machine learning model;

compiling the machine learning model;

wirelessly obtaining verification data from the network device;

validating the machine learning model with the verification data to determine a performance level of the machine learning model;

wirelessly receiving first instructions, from the network device, to activate the machine learning model in response to the performance level exceeding a threshold level;

wirelessly receiving second instructions, from the network device, to fall back to a non-machine learning model in response to the performance level being below the threshold level; and communicating with the network device in accordance with inferences from the machine learning model in response to the performance level exceeding the threshold level or in accordance with processing by the non-machine learning model in response to the performance level being below the threshold level.

2. The method of claim 1, further comprising reporting the performance level to the network device.

3. The method of claim 1, in which obtaining the verification data comprises receiving the verification data from the network device.

4. The method of claim 3, in which the network device comprises a machine learning server or a user equipment model repository (UE MR).

5. The method of claim 1, further comprising:

adjusting the quantization in response to the performance level being less than the threshold level; and re-compiling the machine learning model in response to the performance level being less than the threshold level.

6. The method of claim 1, in which validating the machine learning model is based on a maximum error threshold.

7. The method of claim 1, in which validating the machine learning model is based on a maximum mean square error (MSE) threshold.

8. A method of wireless communication by a first network device, comprising:

transmitting a network configuration to a second network device in response to a change in user equipment (UE) environment;

transmitting machine learning model verification data to the second network device in accordance with the network configuration;

receiving a report, from the second network device, indicating performance of a machine learning model with the verification data;

validating the machine learning model in response to the performance satisfying a performance condition;

transmitting first instructions, to the second network device, to activate the machine learning model in response to the performance level exceeding a threshold level; and transmitting second instructions, to the second network device, to fall back to a non-machine learning model in response to the performance level being below the threshold level.

9. The method of claim 8, in which the second network device comprises a user equipment (UE).

10. The method of claim 8, in which the second network device comprises a user equipment model repository (UE-MR).

11. The method of claim 8, in which the performance condition is based on a maximum error threshold.

12. The method of claim 8, in which the performance condition is based on a maximum mean square error (MSE) threshold.

13. An apparatus for wireless communication by a user equipment (UE), comprising:

at least one memory;

at least one wireless transceiver; and at least one processor coupled to the at least one memory and the at least one wireless transceiver, the at least one processor configured:

to wirelessly receive a network configuration from a network device in response to a change in UE environment;

to wirelessly receive a machine learning model at the UE in accordance with the network configuration, the machine learning model being unvalidated and trained;

to quantize inputs to the machine learning model;

to compile the machine learning model;

to wirelessly obtain verification data from the network device;

to validate the machine learning model with the verification data to determine a performance level of the machine learning model;

to wirelessly receive first instructions, from the network device, to activate the machine learning model in response to the performance level exceeding a threshold level;

to wirelessly receive second instructions, from the network device, to fall back to a non-machine learning model in response to the performance level being below the threshold level; and to communicate with the network device in accordance with inferences from the machine learning model in response to the performance level exceeding the threshold level or in accordance with processing by the non-machine learning model in response to the performance level being below the threshold level.

14. The apparatus of claim 13, in which the at least one processor is further configured to report the performance level to the network device.

15. The apparatus of claim 13, in which the at least one processor is further configured to receive the verification data from the network device to obtain the verification data.

16. The apparatus of claim 15, in which the network device comprises a machine learning server or a user equipment model repository (UE MR).

17. The apparatus of claim 13, in which the at least one processor is further configured:

to adjust the quantization in response to the performance level being less than the threshold level; and to re-compile the machine learning model in response to the performance level being less than the threshold level.

18. The apparatus of claim 13, in which the at least one processor is configured to validate the machine learning model based on a maximum error threshold.

19. The apparatus of claim 13, in which the at least one processor is configured to validate the machine learning model based on a maximum mean square error (MSE) threshold.

20. An apparatus for wireless communication by a first network device, comprising:

at least one memory;

at least one wireless transceiver; and at least one processor coupled to the at least one memory and the at least one wireless transceiver, the at least one processor configured:

to transmit a network configuration to a second network device in response to a change in user equipment (UE) environment;

to transmit machine learning model verification data to the second network device in accordance with the network configuration;

to receive a report, from the second network device, indicating performance of a machine learning model with the verification data;

to validate the machine learning model in response to the performance satisfying a performance condition;

to transmit first instructions, to the second network device, to activate the machine learning model in response to the performance level exceeding a threshold level; and to transmit second instructions, to the second network device, to fall back to a non-machine learning model in response to the performance level being below the threshold level.

21. The apparatus of claim 20, in which the second network device comprises a user equipment (UE).

22. The apparatus of claim 20, in which the second network device comprises a user equipment model repository (UE-MR).

23. The apparatus of claim 20, in which the performance condition is based on a maximum error threshold.

24. The apparatus of claim 20, in which the performance condition is based on a maximum mean square error (MSE) threshold.

* * * * *